US007193558B1

(12) United States Patent
Gerlach et al.

(10) Patent No.: US 7,193,558 B1
(45) Date of Patent: Mar. 20, 2007

(54) RADAR PROCESSOR SYSTEM AND METHOD

(75) Inventors: Karl R. Gerlach, Chesapeake Beach, MD (US); Shannon D. Blunt, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/943,647

(22) Filed: Sep. 2, 2004

Related U.S. Application Data

(60) Provisional application No. 60/499,373, filed on Sep. 3, 2003.

(51) Int. Cl.
*G01S 13/88* (2006.01)
(52) U.S. Cl. ..................................... 342/195
(58) Field of Classification Search ................. 342/195
See application file for complete search history.

(56) References Cited

U.S. PATENT DOCUMENTS 6,904,444 B2     6/2005  Picciolo et al.
7,120,657 B2 *  10/2006  Ricks et al. ................ 708/322

OTHER PUBLICATIONS

Gerlach et al., Efficient Reiterative Censoring of Robust Stap Using the Fracta Algorithm, 2003, IEEE, pp. 57-61.*
Blunt et al.,Efficient Robust AMF Using the Fracta Algorithm, Apr. 2005, IEEE, pp. 537-548.*
Gerlach et al., Efficient Reiterative Censoring of Robust Stap Using the Fracta Algorithm; Sep. 3, 2003; IEEE, pp. 57-61.*
U.S. Appl. No. 09/933,004, Ricks et al.
Reed, I.S., Mallet, J.D., Brennan, L.E., "Rapid Convergence Rate in Adaptive Arrays", IEEE Trans. Aerospace and Electronic Systems, vol. AES-10, No. 6, Nov. 1974, pp. 853-863.
Antonik, P. Schuman, H. Melvin, W., Wicks, M., "Implementation of Knowledge-Based Control for Space-Time Adaptive Processing", IEEE Radar 97 Conference, Oct. 14-16, 1997, pp. 478-482.
J.R. Guerci and J.S. Bergin, "Principal Components, Covariance Matrix Tapers, and the Subspace Leakage Problem", IEEE Transactions on Aerospace and Electronic Systems, vol. 38, No. 1, Jan. 2002, pp. 152-162.

(Continued)

*Primary Examiner*—Dan Pihulic
(74) *Attorney, Agent, or Firm*—John J. Karasek; L. George Legg

(57) ABSTRACT

An adaptive radar processing system includes an antenna array for transmitting a radar signal and for receiving a return radar signal, and a signal processor programmed with an enhanced FRACTA algorithm (FRACTA.E). The basic FRACTA algorithm is enhanced to FRACTA.E with (any or all of) five enhancements, versions 1–5. Version 1 is a stopping criterion, for censoring samples, that is adaptive to a radar return data set. The inclusion of a stopping criterion improves the computational speed of FRACTA.E thereby improving its efficiency. Version 2 uses global censoring. Version 3 uses fast reiterative censoring. Version 4 uses segmenting of data vectors for AMF application. Version 5 uses Knowledge-aided covariance estimation (KACE) to reduce the required sample support that may be necessary in non-homogeneous environments, providing substantially the same level of detection performance with considerably less training data.

20 Claims, 11 Drawing Sheets

OTHER PUBLICATIONS

K. Gerlach, "Outlier Resistant Adaptive Matched Filters", *IEEE Trans. on AES*, vol. 38, No. 2, Jul. 2002, pp. 885-901.

P. Chen. W.L. Melvin. and M.C. Wicks, "Screening among Multivariate Normal Date", *Journal of Multivariate Analysis*, 69, pp. 10-29, 1999.

M.J. Steiner and K. Gerlach, "Fast converging adaptive processor or a structured covariance matrix", *IEEE Trans. on Aerospace and Electronic Systems*, vol. 36, No. 4, pp. 1115-1126, Oct. 2000.

T.K. Moon and W.C. Stirling, "Mathematical Methods and Algorithms for Signal Processing", pp. 258-261, Prentice Hall, Upper Saddle River, NJ, (2000).

J. Ward, "Space-time adaptive processing for airborne radar," MIT Lincoln Lab Technical Report ESC-TR-94-109, Dec. 1994 (179 pages).

K. Gerlach, "The Effects of Signal Contamination on Two Adaptive Detectors", IEEE Trans. on AES, vol. 30, No. 1, pp. 297-309 Jan. 1995.

* cited by examiner

RADAR PROCESSOR SYSTEM AND METHOD

The present application claims the benefit of the priority filing date of provisional patent application No. 60/499,373, filed Sep. 3, 2003, incorporated herein by reference.

FIELD OF THE INVENTION

This invention relates to a processing method and system for radar applications. More particularly, the invention relates to adaptive radar processing.

BACKGROUND OF THE INVENTION

Radar systems such as those used for airborne applications typically have to contend with the presence of non-homogeneous clutter, jamming, and dense target clusters. An approach that has proved successful in minimizing the masking effect of undesirable false signals on a target return signal is adaptive matched filtering for signal processing.

Adaptive signal processing systems have many applications including radar reception, cellular telephones, communications systems, and biomedical imaging. Adaptive signal processing systems utilize adaptive filtering to differentiate between the desired signal and the combination of interference and noise, i.e. thermal or receiver noise. An adaptive filter is defined by four aspects: the type of signals being processed, the structure that defines how the output signal of the filter is computed from its input signal, the parameters within this structure that can be iteratively changed to alter the filter's input-output relationship, and the adaptive algorithm that describes how the parameters are adjusted from one time instant to the next.

Common applications of adaptive signal processing include: an adaptive radar reception antenna array, an adaptive antenna array for adaptive communications, and adaptive sonar. In these systems, desired signal detection and estimation is hindered by noise and interference. Interference may be intentional jamming and or unintentional received radiation. Noise is usually described as ever present receiver thermal noise, generally at a low power level. In these applications antenna arrays may change their multidimensional reception patterns automatically in response to the signal environment in a way that optimizes the ratio of signal power to the combination of interference power plus noise power (abbreviated as SINR). The array pattern is easily controlled by weighting the amplitude and phase of the signal from each element before combining (adding) the signals. In general, multidimensional samples may be collected, e.g. over antenna elements, over time, over polarization, etc., where each sample is a separate, input channel to the adaptive processor. Adaptive arrays are especially useful to protect radar and communication systems from interference when the directions of the interference are unknown or changing while attempting to receive a desired signal of known form. Adaptive arrays are capable of operating even when the antenna elements have arbitrary patterns, polarizations, and spacings. This feature is especially advantageous when an antenna array operates on an irregularly shaped surface such as an aircraft or ship.

Adaptive signal processing systems are required to filter out undesirable interference and noise. Due to the lack of a priori knowledge of an external environment, adaptive signal processing systems require a certain amount of statistically independent weight training data samples (called secondary sample data) to effectively estimate the input noise and interference statistics.

"Ideal" weight training data has a Gaussian probability distribution for both its real and imaginary baseband components. However, real-world weight training data may be contaminated by undesirable impulse noise outliers, resulting in a non-Gaussian distribution of real and imaginary components.

The number of weight training data samples required for SINR performance of the adaptive processor to be within 3 dB of the optimum on average is called the convergence measure of effectiveness (MOE) of the processor. A signal is stationary if its statistical probability distribution is independent of time. For the pure statistically stationary Gaussian noise case, the convergence MOE of the conventional Sample Matrix Inversion (SMI) adaptive linear technique can be attained using approximately 2N samples for adaptive weight estimation, regardless of the input noise covariance matrix, where N is the number of degrees of freedom in the processor (i.e., the number of antenna elements or subarrays) for a spatially adaptive array processor, or N is the number of space-time channels in a space-time adaptive processing (STAP) processor). Referred to as the SMI convergence MOE, convergence within 3 dB of the optimum using approximately 2N samples for adaptive weight estimation has become a benchmark used to assess convergence rates of full rank adaptive processors. General information regarding SMI convergence MOE may be found in Reed, I. S., Mallet, J. D., Brennan, L. E., "Rapid Convergence Rate in Adaptive Arrays". IEEE Trans. Aerospace and Electronic Systems, Vol. AES-10, No. 6, November, 1974, pp. 853–863, the disclosure of which is incorporated herein by reference.

Conventional sample matrix inversion (SMI) adaptive signal processing systems are capable of meeting this benchmark for the pure statistically stationary Gaussian noise case. If, however, the weight training data contains non-Gaussian noise outliers, the convergence MOE of the system increases to require an unworkably large number of weight training data samples. The performance degradation of the SMI algorithm in the presence of non-Gaussian distributions (outliers) can be attributed to the highly sensitive nature of input noise covariance matrix estimates to even small amounts of impulsive non-Gaussian noise that may be corrupting the dominant Gaussian noise distribution. General information regarding the sensitivity of the SMI algorithm may be found in Antonik, P. Schuman, H. Melvin, W., Wicks, M., "Implementation of Knowledge-Based Control for Space-Time Adaptive Processing", IEEE Radar 97 Conference, 14–16 Oct., 1997, p. 478–482, the disclosure of which is incorporated herein by reference.

Thus, for contaminated weight training data, convergence rate may slow significantly with conventional systems. Fast convergence rates are important for several practical reasons including limited amounts of weight training data due to non-stationary interference and computational complexity involved in generating adaptive weights. In other words, the time which elapses while a conventional system is acquiring weight training data and generating adaptive weights may exceed the stationary component of a given non-stationary noise environment, and an adaptive weight thus generated has become obsolete prior to completion of its computation.

Most real world data does not have a purely Gaussian probability distribution due to contamination by non-Gaussian outliers and/or desired signal components. Conventional signal processors assume that the weight training data has a Gaussian distribution, and therefore they do not perform as well as theory would predict when operating with real world data. If weight training data contains desired signals that appear to be outliers, the performance is similarly degraded.

Optimal, reduced rank, adaptive processors are derived primarily to combat the problem of non-stationary data conditions (i.e. low sample support) often encountered in general applications. However, they still have convergence MOE's that are degraded by outliers. For radar applications, these provide better SINR output than full rank methods, typically through the use of localized training data to improve statistical similarity with the range cell under test (CUT). An exemplary system is described in U.S. Pat. No. 7,120,657, "System and Method For Adaptive Filtering", Goldstein et al., issued Oct. 10, 2006, incorporated herein by reference.

Also, full rank, robust, adaptive processor research has resulted in novel open loop processors capable of accommodating an amount of non-Gaussian/outlier contaminated and nonstationary data, while still producing an SMI-like convergence MOE. An exemplary system is described in U.S. Pat. No. 6,904,444. "Pseudo-Median Cascaded Canceller", Picciolo et al., issued Jun. 7, 2005, incorporated herein by reference.

Reduced rank processors have a convergence MOE typically on the order of 2r, where r is the effective rank of the interference covariance matrix. Effective rank refers to that value of r which is associated with the dominant eigenvalues of the interference and noise covariance matrix. General information regarding "effective rank" and general trends in the convergence MOE of reduced rank processors may be found in "Principal Components, Covariance Matrix Tapers, and the Subspace Leakage Problem", J. R. Guerci and J. S. Bergin, IEEE Transactions on Aerospace and Electronic Systems, Vol. 38, No. 1, January 2002.

Fundamental to most adaptive matched filter (AMF) methods is the accurate estimation of the unknown input covariance matrix. The true covariance matrix provides the optimal linear weighting of MN input elements such that the output signal-to-interference ratio is maximized, where N is the number of antenna elements and M is the number of pulses. Due to the lack of knowledge of an external environment, adaptive techniques require a certain amount of data to estimate the MN×MN input covariance matrix effectively. Minimizing the convergence MOE is important since the characteristics of the external interference change rapidly with time in many environments.

Typically for adaptive radar applications, the sample covariance matrix is estimated using training data from range cells close to the CUT. However, the presence of outliers in the training data can skew the covariance matrix estimate such that a true target in the primary range cell is suppressed. Therefore, it is important that all relevant outliers be excised.

A variety of conditions exists wherein outlier data can be present. For example, sidelobe-clutter discretes could be present in only a few range cells. The temporal covariance matrix of the sidelobe-clutter discretes is much different than that of other sources such as the surrounding sea clutter. This problem is closely related to the existence of land-sea clutter interfaces, which cause significant degradation in airborne radar adaptive processing. Other sources of outlier data are the desired targets themselves. For example, if one is trying to detect an individual target adaptively in the presence of a formation of targets (such as an airborne formation), the other desired target returns, located in distinct range cells about the individual desired target with essentially the same velocity vector, can be present in the training data. All of the desired targets have approximately the same desired steering vector. The presence of the desired target returns in the training data can severely degrade the adaptive match filter's performance, because the training data is used to estimate a weighting vector which is in the null space of the signal and interference sources that are in the training data. Hence, if a signal that has the desired signal's steering vector is in the training data, the adaptive weight vector may null the desired signal.

"Outlier Resistant Adaptive Matched Filters", K. Gerlach, IEEE Trans. on AES, Vol. 38, No. 2, July 2002, incorporated herein by reference, describes a robust AMF whereby outlier data vectors in the training data are censored from the covariance matrix estimate using the Maximum Likelihood Estimation (MLE) setting. The Reiterative Censored Fast Maximum Likelihood (RCFML/GIP) technique is based on eliminating a fixed number of snapshots from the training set in reiterative fashion using a version of the Generalized Inner Product (GIP) metric, described in "Screening among Multivariate Normal Data", P. Chen. W. L. Melvin. and M. C. Wicks, *Journal of Multivariate Analysis,* 69, pp. 10–29, 1999, and incorporated herein by reference. The RCFML's convergence performance was shown to be relatively unaffected by the presence of outliers where the interference scenario consisted of homogeneous Gaussian noise plus the outliers.

It would be desirable to extend these techniques to situations that include nonhomogeneous clutter and other such interference sources.

SUMMARY OF THE INVENTION

According to the invention, an adaptive radar processing system includes an antenna array for transmitting a radar signal and for receiving a return radar signal, and a signal processor programmed with an enhanced FRACTA algorithm (FRACTA.E). The basic FRACTA algorithm is enhanced with any or all of five enhancements (FRACTA.E versions 1–5). Version 1 is a stopping criterion, for censoring samples, that is adaptive to a radar return data set. The inclusion of a stopping criterion improves the computational speed of FRACTA.E, improving its performance and efficiency. Version 2 uses global censoring. Version 3 uses fast reiterative censoring. Version 4 uses segmenting of data vectors for AMF. Version 5 uses Knowledge-aided covariance estimation (KACE) to reduce the required sample support that may be necessary in non-homogeneous environments, providing substantially the same level of detection performance with considerably less training data.

Also according to the invention, a method for adaptive radar processing includes transmitting a radar signal; receiving a return radar signal; and processing the return radar signal with the FRACTA.E algorithm, versions 1–5 or any combination thereof.

Version 1, for example, uses a stopping criterion. The inclusion of a stopping criterion improves the computational speed of FRACTA.E thereby improving its efficiency. The stopping criterion is denoted as the Censoring Stopping Rule (CSR).

Further modifications that increase the utility and/or the performance of the adaptive radar processing system with FRACTA.E include the application of Global Censoring (GC) (version 2) or the application of Fast Reiterative Censoring (FRC) (version 3). Adaptive processing at less than full resolution by segmenting the data vectors is another enhancement to FRACTA (version 4). This is henceforth denoted as Data Vector Segmentation (DVS).

An additional modification improving the performance of the system and method of the invention is supplementing FRACTA with Knowledge-aided Covariance Estimation (KACE) (version 5), which reduces the required sample support that may be necessary in non-homogeneous environments. FRACTA.E (version 5) can then achieve substantially the same level of detection performance with considerably less training data.

Versions 1–5 may be used in any combination together to realize improvements in computational performance and speed.

Additional features and advantages of the present invention will be set forth in, or be apparent from, the detailed description of preferred embodiments which follows.

DETAILED DESCRIPTION OF THE PREFERRED EMBODIMENTS

Figure 1:
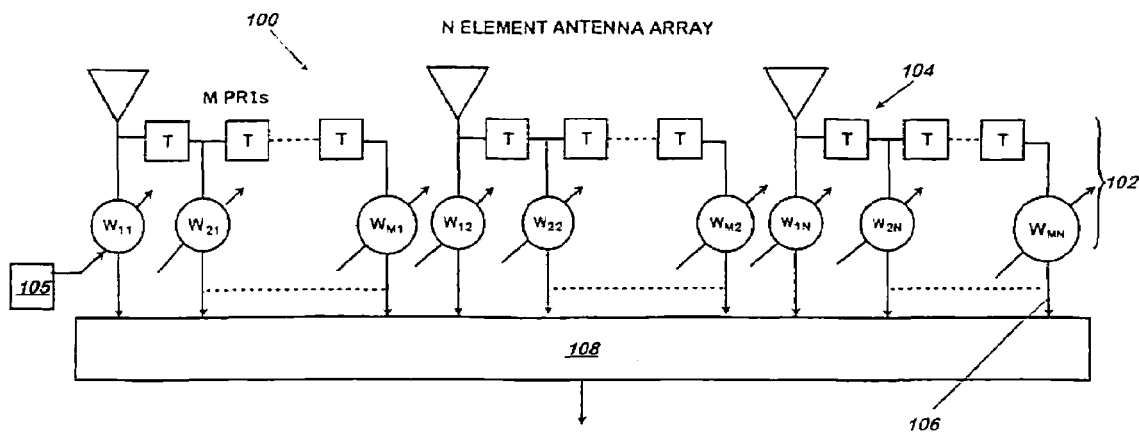
FIG. 1 is a schematic diagram of an adaptive radar system according to the invention.

Referring now to FIG. 1, a radar system 100 includes an N-element uniform linear array 102 resulting in N Radio Frequency (RF) input channels. Each of the N array elements has M time delayed inputs 104 which are combined via adaptive linear weighting to form outputs 106 such that an output performance measure (such as signal-to-noise (S/N) power ratio) is optimized. The adaptive linear weighting is determined by a STAP processor 105. A combiner 108 accumulates the weighted outputs to form the final output power residue.

Assume that for each of these RF channels, the radar front end carries out amplification, filtering, reduction to baseband, and analog-to-digital (A/D) conversion. The output of each A/D is a data stream of in-phase and quadrature phase (I, Q) output pairs. The I and Q components represent the real and imaginary parts, respectively, of the complex valued data stream. The radar waveform is assumed to be a burst of M identical pulses with pulse repetition interval (PRI) equal to T. Target detection is based upon the returns from this burst. The input data in the respective channels are sampled to form range-gate samples for each pulse. For a given range gate, an MN-length sample vector called a snapshot is formed by stacking in succession the N-length data vectors associated with each of the antenna channels for each of the M pulses. Signal presence is sought in one CUT at a time. The secondary data vectors (of length MN) are called the training data and are used to form the adaptive weight vector (of length MN) which implements an AMF. This adaptive weight is applied to the CUT data vector (of length MN) which may or may not be one of the secondary vectors. The secondary and CUT vectors are assumed to have the same covariance matrix in the derivation of the optimal estimate of the optimal adaptive weighting vector. However, the issue of the effects of nonhomogeneous CUT and secondary data vectors (i.e., they may have different covariance matrices) on performance is important because of the resultant performance degradation. This effect is modeled via the RLSTAP clutter model whereby nonhomogeneous synthetic clutter in range is generated. The input interference present in the main and auxiliary channels consists of three statistically independent components: thermal noise (system noise and external thermal noise), clutter and jamming. Let z represent one of the MN-length data vectors. Assuming that there is no desired signal present, then $z=z_t+z_c+z_j$ where $z_t$, $z_c$, and $z_j$ represent the thermal noise, clutter, and jamming components, respectively. Let $R_t$, $R_c$, and $R_j$ represent the MN×MN covariance matrices associated with the thermal noise, clutter, and jamming components, respectively, where each is a positive semi-definite Hermitian (psdh) matrix. If R is the covariance matrix of z defined as $R=E\{zz'\}$, where E denotes the expected value and ' denotes the conjugate transpose operation, then because of the mutual statistical independence of thermal noise, clutter, and jamming components: $R=R_t+R_c+R_j$. It can be assumed without loss of generality that the thermal noise on each of the MN elements of $z_t$ are statistically independent and with power equal to one. Thus $R_t=I_M \otimes I_N$ where $I_h$ denotes the h'th order identity matrix and $\otimes$ the Kronecker matrix product. Furthermore it is commonly assumed that the jamming components are statistically independent from pulse-to-pulse (i.e. barrage jamming); thus it can be shown that $R_j=I_M \otimes R_j$ where $R_j$ is the spatial N×N jamming covariance matrix associated with the elements of the linear array.

The primary data vector may contain a desired signal vector denoted by as where a is an unknown complex amplitude and s is an MN-length column vector related to the desired signal. For the input data structure previously described, the spatio-temporal steering vector s takes the form: $s=s_d \otimes s_s$, where $s_d$ is an M-length temporal steering vector related to the desired signal's Doppler shift and $s_s$ is an N-length spatial steering vector associated with the desired signal's spatial phase shift. For a moving target with Doppler phase shift per pulse equal to $\Phi$: $s_d=(1\ e^{j\Phi} e^{2j\Phi} \ldots e^{(m-1)j\Phi})^T$ where superscript T denotes transpose.

Given s and MN×MN interference covariance matrix R, it is well-known that conjugate weighting of the MN-length primary data vector which maximizes output signal-to-interference power ratio (SIR) is given by w=R$^{-1}$s. For adaptive problems, R is generally not known but there may exist a priori information about the structure of R. For example, as noted above, the jamming component of R has the form $I_M \otimes R_j$ where $R_j$ is the unknown spatial N×N jamming covariance matrix. Furthermore, for radar systems at microwave frequencies, the thermal noise is generally dominated by the internal noise power that can be readily measured. Hence, it can be assumed that the thermal noise covariance matrix is known. Given this knowledge, the Fast Maximum Likelihood (FML) algorithm described in "Fast converging adaptive canceller for a structural covariance matrix", M. J. Steiner and K. Gerlach, *IEEE Trans. on Aerospace and Electronic Systems*, Vol. 36, No. 4, pp. 1115–1126, October 2000 ("Steiner et al.") and incorporated herein by reference, may be used to compute the adaptive weight from the uncensored or censored input data.

Methods for censoring input data vectors from the training data are as follows. The initial training data (ITD) is defined as an initial or original set of K input snapshots of length MN, the censored training data (CTD) as an $M_{out}$ element subset of ITD of censored snapshots where $M_{out}$ is a fixed number of input data vectors that are censored, and the uncensored training data (UTD) as the K-$M_{out}$ element subset of ICT of uncensored snapshots. Thus ITD=UTD∪CTD. Let $Z_k$, k=1, 2, ..., K, denote the MN×1 vectors of ITD, and R equal the estimate of the covariance matrix which is derived using ITD.

There are two metrics that are most often used to censor data vectors from the ITD. These are the Generalized Inner Product (GIP) and the Adaptive Power Residue (APR). Regarding the latter, APR metric is a discriminant for censoring sample snapshots. In its most simplistic form, the APR is the instantaneous power of the adaptive filter output for a range cell associated with a particular snapshot. The motivation for using the APR metric for censoring data samples is intuitively straight-forward: a large APR (relatively speaking) would indicate that the given cell does not share all of the covariance matrix structure of the ambient cells and thus should be censored.

For illustrative purposes (there are other ways of defining these metrics), GIP and APR are defined by $$GIP: z_k'R^{-1}z_k, k=1, 2, \ldots, K, \quad (1)$$

$$APR: [s_k'R^{-1}z_k]^2, k=1, 2, \ldots, K. \quad (2)$$

The simplest form of a censoring algorithm using either one of the above metrics is as follows. Let $m_k$ (k=1, ..., K) denote either $z_k'R^-z_k$ or $[s_k'R^{-1} z_k]^2$. Let $m_{(k)}$, k=1, 2, ... K denote the ordered sequence where $m_{(j)} \leq m_{(2)} \leq \ldots \leq m_{(k)}$. If $M_{out}$ data vectors are to be censored, then the data vector indices corresponding to some combination of the $M_{out}$ lowest and/or highest valued metrics (i.e. $m_{(k)}$, k=1, 2, ... K) are censored. The data vectors associated with the indices that were not censored are used to estimate the covariance matrix and hence to calculate the adaptive weight. For the censoring algorithms to be presented, the highest valued metric indices are always censored. An effective censoring methodology was introduced in Chen et al, supra, whereby data snapshots are censored reiteratively. If 'Ω denotes the set of sample indices for a given ITD set, then it is evident that a reiterative procedure for eliminating an arbitrary number of data snapshot indices from 'Ω is to eliminate a snapshot one at a time where at each step, 'Ω is set equal to the set of indices of the remaining snapshots. For example, if the GIP metric were used then on the first iteration the unknown covariance matrix would be estimated from the ITD using the FML. Thereafter, the GIP metric is calculated for the K snapshots in the ITD (see Eq. (1)) and put in ascending order. The range sample snapshot associated with the largest GIP is censored resulting in a new training data set that consists of the K−1 remaining snapshots. The second iteration censors in similar fashion a snapshot from the remaining K−1 snapshots where the unknown covariance matrix is calculated via the FML algorithm from these snapshots. This methodology is reiterated for as many times as desired. With respect to the GIP and APR metrics, this censoring/adaptive weight technique is denoted as the Reiterative Censored FML using the GIP metric (or simply RCFML/GIP) and the Reiterative Censored FML using the APR metric (RCFML/APR).

Two exemplary methods of processing input data are Sliding Window Processing (SWP) and Concurrent Block Processing (CBP). For SWP, the CUT and a fixed number of cells to the right and left of the CUT (these cells are called guard cells) are not in the ITD. In addition the ITD changes for each CUT. The ITD consists of the K/2 (assume K is even) snapshots (indexed in range) to the immediate right of the right guard cells and K/2 snapshots to the immediate left of the left guard cells. The CUT has the center index of the ITD. An adaptive weight is calculated from the ITD or UTD (depending on whether censoring is used). This adaptive weight is applied just to the CUT. After a given CUT is adaptively processed, the next CUT (i.e. the CUT associated with the next contiguous range cell) is adaptively processed, and so on and so on. If SWP is used for the two censoring algorithms previously discussed, these algorithms are designated as SWP RCFML/GIP and SWP RCFML/APR. For CBP, there are no guard cells and the CUTs are a group of range indices centered on the center index of the ITD. One or two adaptive weights are calculated and applied back onto the CUTs. If CBP is used and one adaptive weight is calculated, the previously mentioned censoring adaptive algorithms can be re-designated as CBP RCFML/GIP, and CBP RCFML/APR.

This combination of using the FML algorithm, Reiterative Censoring, the APR metric, Concurrent Block Processing, the Two-Weight-method (2 adaptive weights) and the resultant ACE metric, termed "FRACTA", is described in "Robust STAP using reiterative censoring", K. Gerlach and M. Picciolo, pp. 244–51, Proceedings of the IEEE Radar Conference, (2003) ("Gerlach et al."), incorporated herein by reference, which also discloses that a two-weight CBP adaptive censoring algorithm yields improved performance compared with a single-weight algorithm. The combination of CBP RCFML/APR test statistic and the ACE test statistic yields an effective metric for discerning real targets in nonhomogeneous interference.

Figure 2:
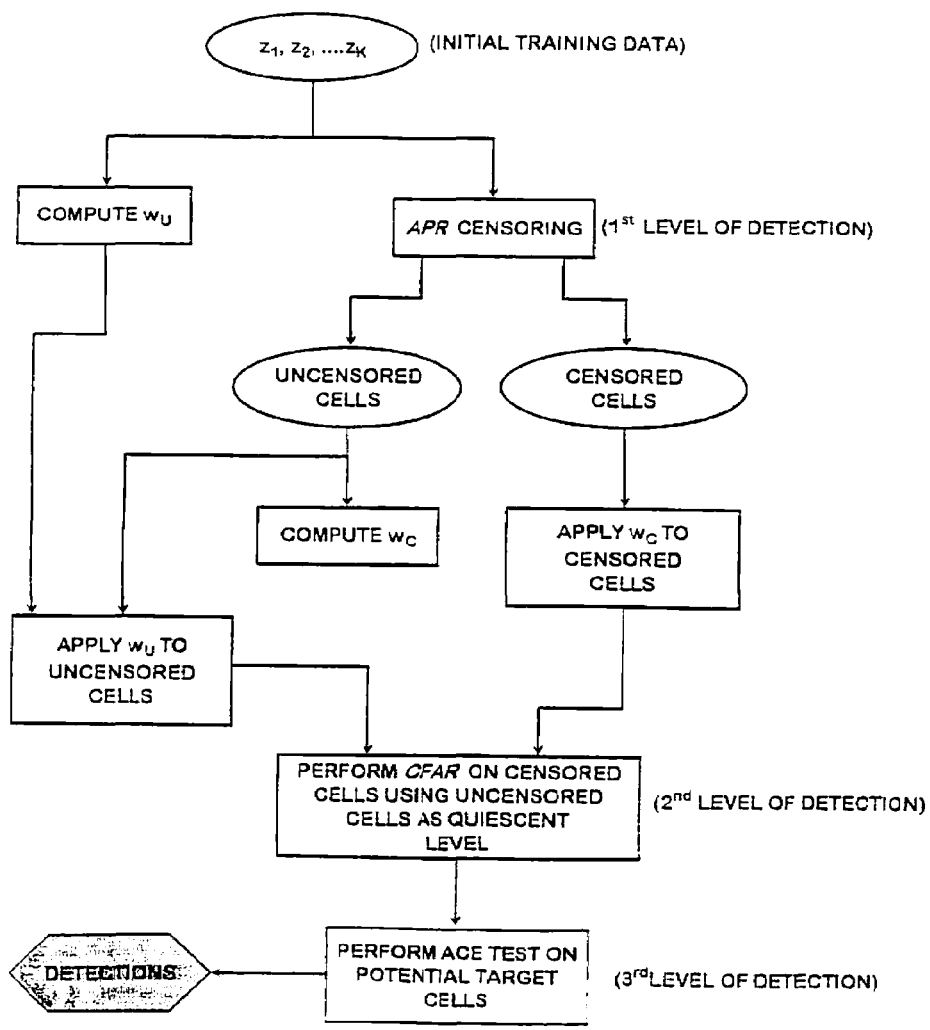
FIG. 2 is a block diagram showing the general operation of the FRACTA algorithm.

The general operation of FRACTA is illustrated in FIG. 2 which as described above reiteratively censors the FML covariance matrix estimate using APR, by reiteratively removing from the block of training data the cell that possesses the largest APR, where the APR for the k$^{th}$ snapshot of training data is $$APR: |s'\tilde{R}^{-1}z_k|^2 \quad (3)$$

in which s is the length-MN steering vector, $z_k$ is the k$^{th}$ length-MN data vector, and $\tilde{R}$ is the covariance matrix estimated by FML from the set of K data vectors. In CBP, a set of contiguous CUTs are operated on simultaneously in which no guard cells are used and the CUTs are in the training data. The training data is reiteratively processed to excise any range cells that are likely to be targets (i.e. have a relatively large APR), which results in a set of censored cells (potential targets if a CUT) and a set of uncensored cells. The uncensored cells are used to compute an adaptive weight $w_C$ that is then applied to the censored CUTs. The total data block (both censored and uncensored cells) is also used to compute an adaptive weight $w_U$ for the uncensored CUTs. The use of these two weights results in targets standing out dramatically from the suppressed noise and interference. A cell averaging—constant false alarm rate (CA-CFAR) detection threshold is performed on each censored CUT in which the value of the average background noise and interference is computed using the output residue from local uncensored CUTs. Finally, the ACE is used to determine which of the potential targets that passed the CA-CFAR coherently match the steering vector of interest. In this way, the ACE eliminates false targets that may come through the space-time filter sidelobes.

It should be noted, however, that the censoring process in FRACTA is computationally demanding and is the most computationally intensive portion of the FRACTA algorithm as well as being the first level of detection. FRACTA therefore is preferably enhanced in a first version termed FRACTA.E version 1 by the application of a stopping criterion for censoring samples that is adaptive to the data as the vast majority of the targets will be located in Dopplers that are relatively close to the clutter yet high Doppler regions cannot be ignored or targets may be missed. In FRACTA.E version 1, a robust Censoring Stopping Rule (CSR) adaptive to the data is preferably applied as follows. A probe data vector that is appended to the data block takes on the form $$\text{probe: } \alpha_p s \qquad (4)$$

where $\alpha_p$ is a pre-determined magnitude that is set such that the probe vector is nominally detectable (10–15 dB above the noise floor). The APR of the probe is found to be $|\alpha_p s' \tilde{R}^{-1} s|^2$, and whenever this value exceeds the APR for all the true data vectors, censoring is halted. Note that the CSR is somewhat conservative because it does not contain noise and interference which would increase the APR of the probe, especially near the clutter ridge. Therefore, it is still useful to maintain an upper limit on the number of cells allowed to be censored for a given data block.

Besides the CSR, other approaches also enhance the performance and/or reduce the computational load of the FRACTA algorithm. In a second version termed FRACTA.E version 2, the approach is Global Censoring (GC), which pertains to the way in which data is assigned to blocks for processing. Conventional wisdom leads one to set small block sizes when computing the adaptive weight vector due to the possible non-stationarity of the data. However, when performing censoring using the APR metric, one is searching for data vectors that possess some degree of similarity with a specific steering vector s and it is not necessarily important to maximally suppress the interference as in AMF. Furthermore, at each reiterative step all the remaining uncensored data vectors are contained in the current estimate of the covariance matrix, thus it is desirable to have the target-like cells to be "nulled the least". Typically, only a relatively small number of range cells will contain a target. However, targets also tend to be clustered close together such as ground traffic on roads. Therefore, it makes sense to use as many data vectors as possible for censoring in order to drive down the eigenvalues of $\tilde{R}$ corresponding to target cells especially in regions of dense target clusters. In this manner, GC takes a large block (if not all) of the data vector samples to perform censoring for each individual doppler. Hence, target cells tend to be nulled the least and therefore will most likely possess the largest APR values resulting in their being correctly censored.

In a third version termed FRACTA.E version 3, the approach is Fast Reiterative Censoring (FRC), in which the FML for covariance matrix estimation is replaced with a Loaded Sample Matrix Inverse (LSMI). Although it is taught in references such as Steiner et al., supra that FML and LSMI produce very similar results, a significant distinction is that LSMI requires substantially less computational effort. Furthermore, the structure of LSMI enables the covariance matrix to be reiteratively re-estimated after a snapshot has been censored without the need to compute a full matrix inverse. This is accomplished by employing an approximation to the matrix inversion lemma (also known as Woodbury's identity), described in "Mathematical Methods and Algorithms for Signal Processing", T. K. Moon and W. C. Stirling, pp. 258–261, Prentice Hall, Upper Saddle River, N.J., (2000), incorporated herein by reference, in which the updated covariance matrix is computed as $$\tilde{R}_{(m)}^{-1} = \left( \frac{K_{(m-1)} - 1}{K_{(m-1)}} \right) \left( \tilde{R}_{(m-1)}^{-1} + \frac{(\tilde{R}_{(m-1)}^{-1} z_k)(\tilde{R}_{(m-1)}^{-1} z_k)'}{K_{(m-1)} - z_k' \tilde{R}_{(m-1)}^{-1} z_k} \right), \qquad (5)$$

where $z_k$ is the data vector being censored, $\tilde{R}_{(m-1)}^{-1}$ is the inverse of the covariance matrix estimate prior to the $m^{th}$ censoring stage, $K_{(m-1)}$ is the number of uncensored samples prior to the $m^{th}$ censoring stage. The initial inverse covariance matrix estimate $\tilde{R}_{(0)}^{-1}$ is computed directly from LSMI and the initial number of uncensored samples $K_{(0)}$ is the data block size. This is an approximation to the inverse covariance matrix in which $K_{(m)}$ will decrease by 1 at each reiterative stage.

Besides the computation speed enhancements of FRACTA.E versions 1, 2, and 3, there exists two additional modifications to FRACTA that enable lower sample support which is useful in severely non-stationary environments, a fourth version termed FRACTA.E version 4, and a fifth version termed FRACTA.E version 5. Both of these modifications pertain to the application of the AMF.

The FRACTA algorithm censoring is preferably done at full resolution (full integration gain MN) to ensure as much accuracy as possible in culling outliers from the data. However, AMF can be performed at a lower resolution with a graceful degradation in performance. In other words, one can use less than MN elements of the respective data vectors to compute the output residue. This is useful because fewer data vectors are needed to estimate a smaller covariance matrix properly, thereby reducing the adverse effects of non-stationarities in estimating an adaptive weight vector. Furthermore, smaller covariance matrices substantially reduce the computational burden of computing a matrix inverse. If the respective data vectors are segmented properly (p=2, 4, etc.), then adaptation can be performed on each segment (using the corresponding segment of the steering vector). The p segmented correlation matrices can be recombined as $$\tilde{R}^{-1} = \begin{bmatrix} \tilde{R}_1^{-1} & 0 & \cdots & 0 \\ 0 & \tilde{R}_2^{-1} & \ddots & \vdots \\ \vdots & \ddots & \ddots & 0 \\ 0 & \cdots & 0 & \tilde{R}_P^{-1} \end{bmatrix} \quad (6)$$

to generate the recombined correlation matrix which is employed to compute the APR and ACE. This is FRACTA.E version 4.

Figure 3:
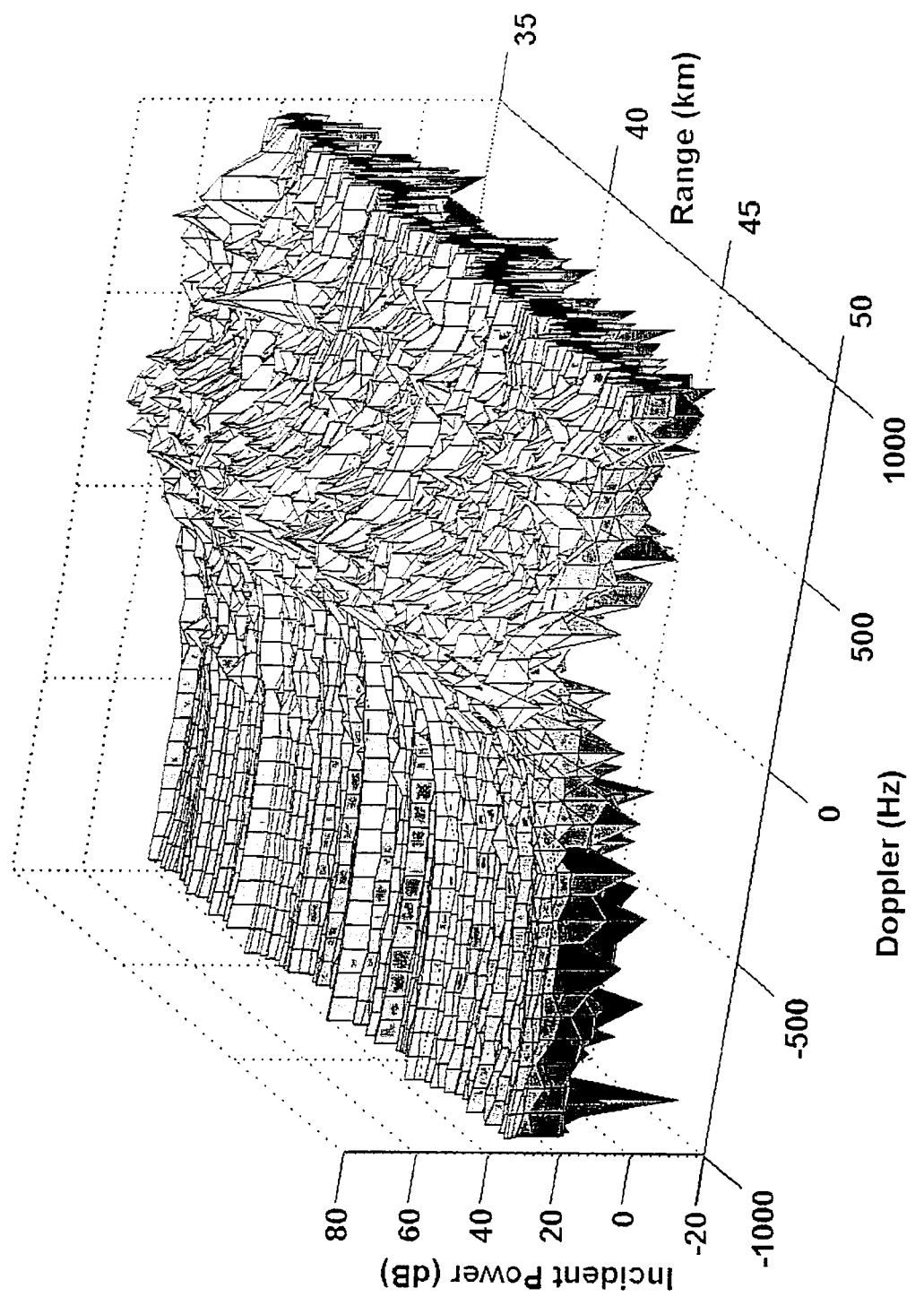
FIG. 3 is a graph for the KASSPER datacube showing incident power vs. range and Doppler along the boresight direction according to the invention.
Figure 4:
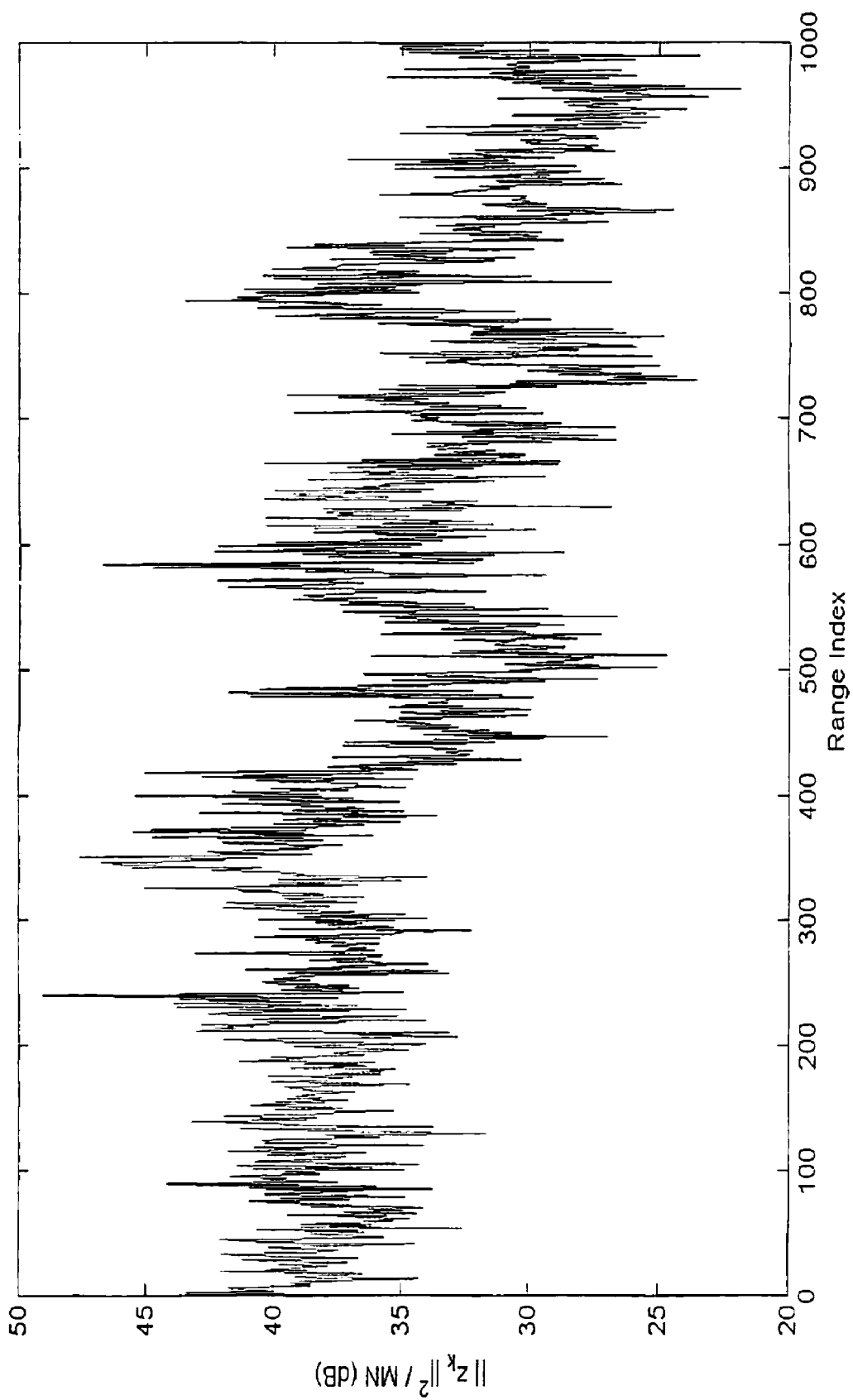
FIG. 4 is a graph for the KASSPER datacube showing the average power incident upon a single antenna element relative to the noise floor according to the invention

In general, it is preferable to use FRACTA.E versions 1, 2, and 3 and in conjunction. In order to ascertain the performance of the FRACTA.E algorithm (versions 1, 2, and 3 combined), it is applied in simulations to the KASSPER challenge data cube, described in Gerlach et al., supra, and shown in FIG. 3, in which M=32 pulses in the CPI and N=11 antenna elements. The average power incident upon a single antenna element relative to the noise floor is depicted in FIG. 4 with the dynamic range roughly 27 dB. Based on this, the (Global) censoring block size is set as K=1000.

A probe that is 10 dB above the noise floor is employed for the Censoring Stopping Rule. Furthermore, since the clutter returns can be several orders of magnitude greater than the noise floor near the clutter ridge, a maximum number of censored cells is instituted for each Doppler bin and is set to 100. For adaptation, the total block size is set to $K_A=120$, of which the 50 cells in the center constitute the primary data block. At the boundaries of the 1000 range cells the secondary data is offset so that the total block size remains constant throughout.

Figure 5:
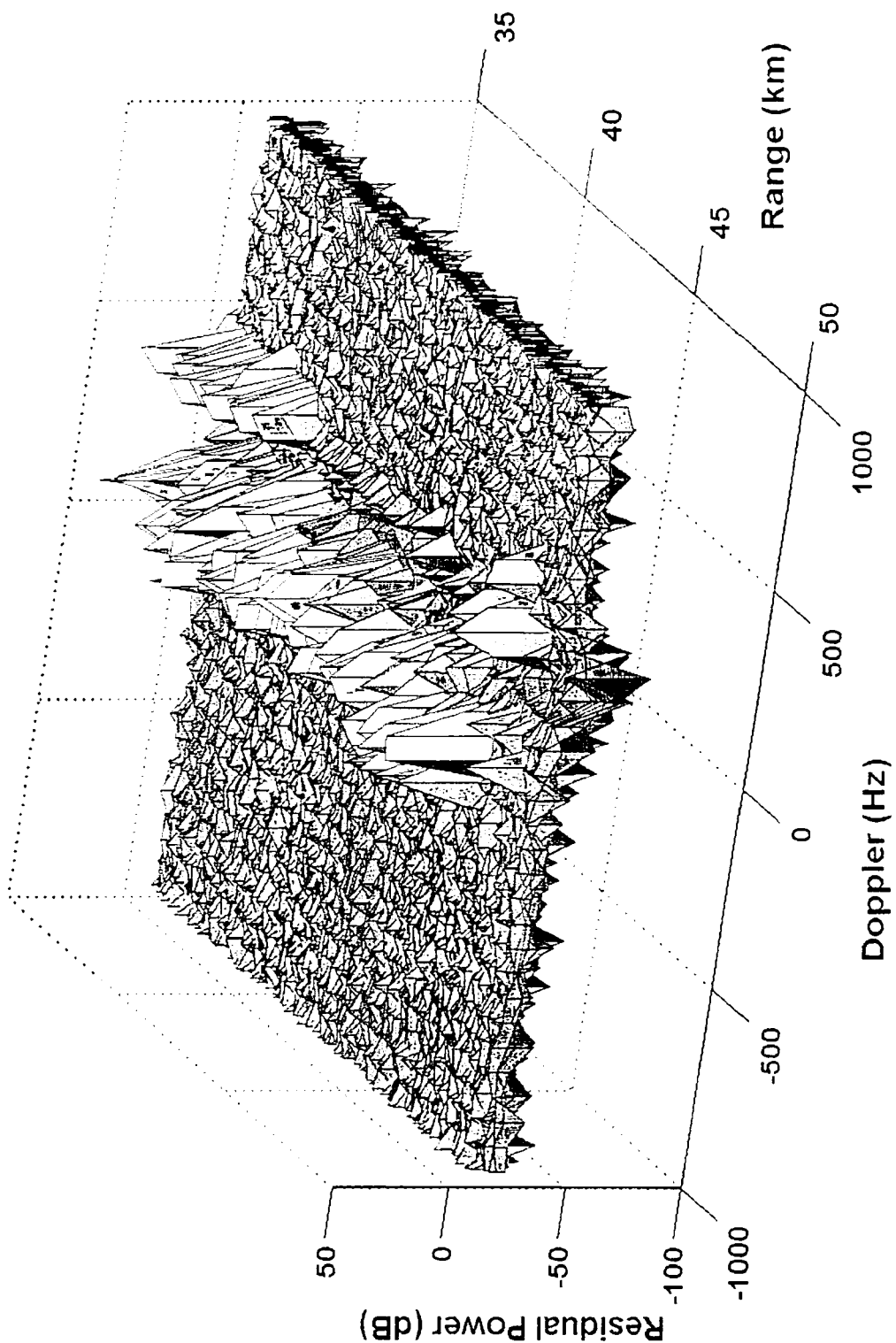
FIG. 5 is a graph for the KASSPER datacube showing the output power residue using FRACTA.E versions 1,2, and 3 (with the CSR, GC, and FRC enhancements) according to the invention.
Figure 6:
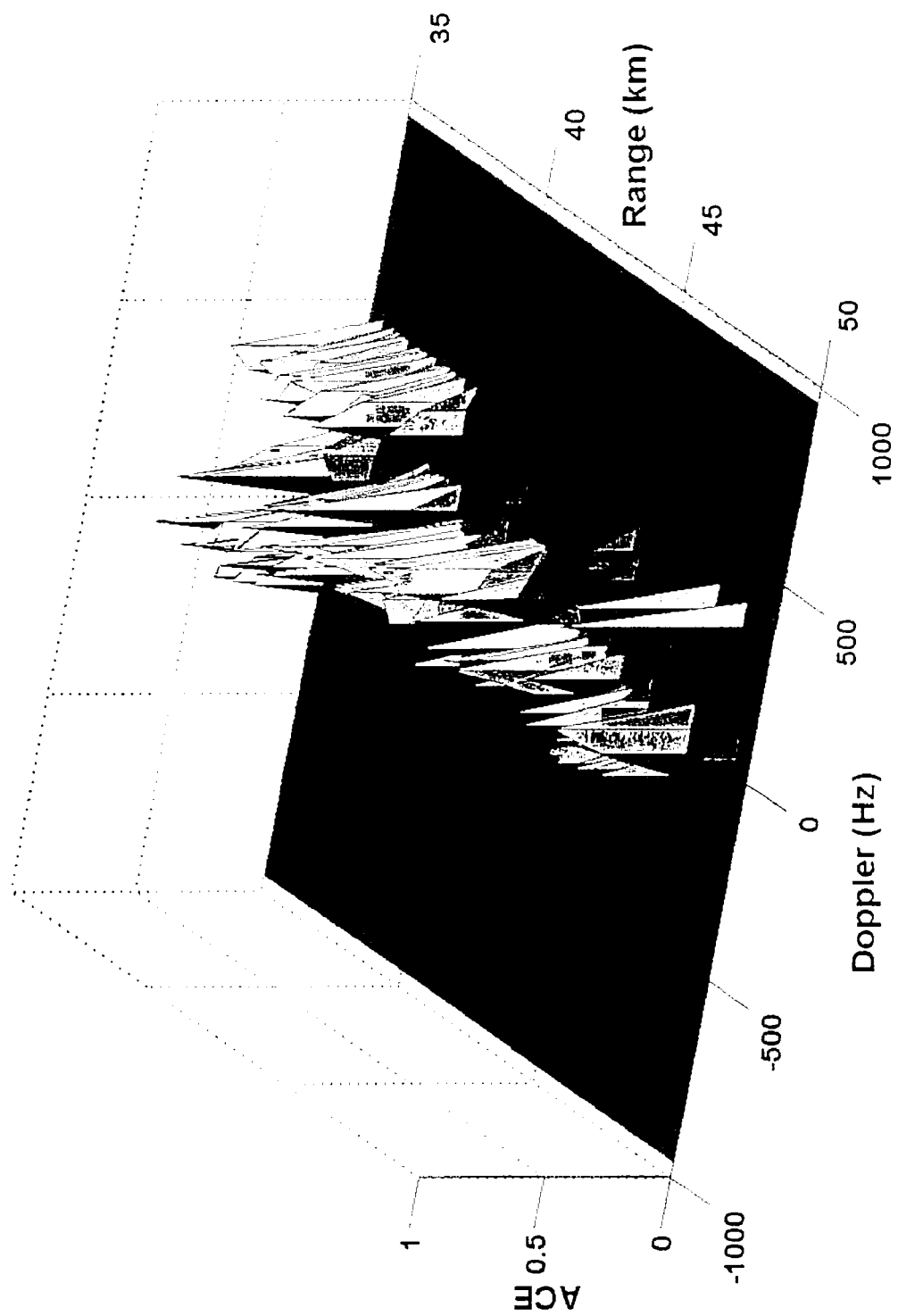
FIG. 6 is a graph for the KASSPER datacube showing the ACE using FRACTA.E versions 1,2, and 3 (with the CSR, GC, and FRC enhancements) according to the invention.

The output APR and ACE are illustrated in FIG. 5 and FIG. 6, respectively, in which full resolution (MN) was employed for adaptation. The enhanced FRACTA algorithm (versions 1, 2, and 3 combined) is quite effective at locating slow-moving targets very close to the peak of the clutter ridge. Of the 32 Doppler bins, only 9 contain true targets and they are all clustered about the clutter ridge. Upon using CSR, a total of only 4 cells were censored in all the Doppler bins not containing targets. The overall result is that when running the FRACTA.E algorithm (with versions 1, 2, and 3 combined) on a single processor, the computation speed is 80 times faster than the original FRACTA algorithm and better than 3 times faster than the standard SWP using LSMI.

Figure 7:
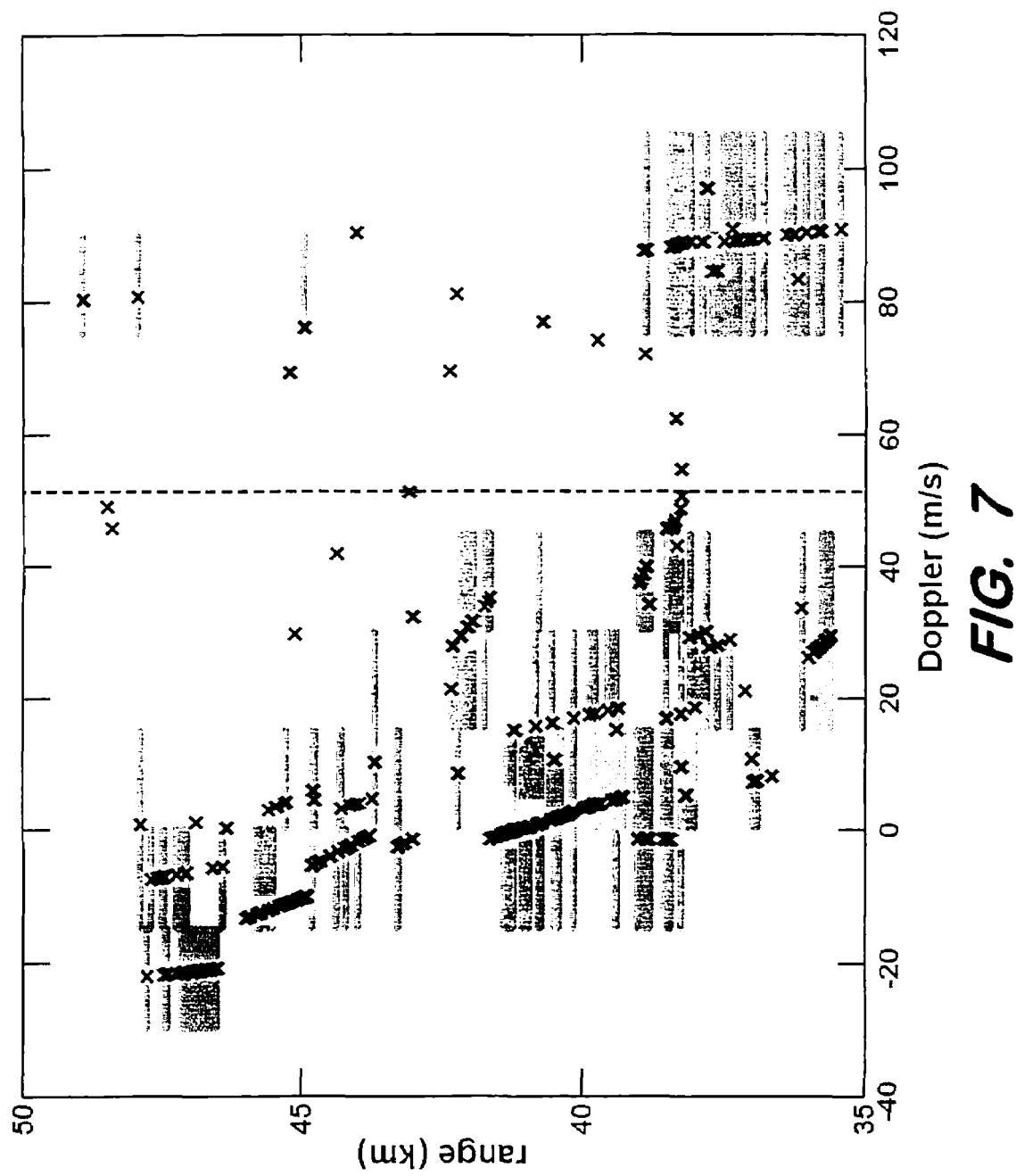
FIG. 7 is a graph of the detection map of KASSPER using FRACTA.E versions 1,2, and 3 (with the CSR, GC, and FRC enhancements) according to the invention.

FIG. 7 presents the true targets (black x) along with the cells detected by FRACTA.E (versions 1, 2, and 3) (gray bar). The peak of the clutter ridge is represented by the dashed vertical line near 50 m/s in Doppler. Using a priori knowledge of the covariance matrices with a yields 192 detected targets out of the 268 targets present for a single false alarm. Thus $P_F=1/32,000=3.125\times10^{-5}$ is the estimated false alarm probability where there are 32×1000 range/Doppler cells. In comparison to the a priori detection results, FRACTA.E (versions 1, 2, and 3) also detects 192 targets for a single false alarm. Therefore, for this particular data set, the performance of the FRACTA.E algorithm (versions 1, 2, and 3) achieves the optimal.

Regarding the performance of the FRACTA.E (versions 1, 2, and 3) algorithm when the data vectors have been segmented for the purposes of AMF (combined with version 4), the detection performance degrades gracefully until a breakdown point is reached. As can be seen in Table 1, below, there is some small loss when going from full resolution to segmentation/recombination by half or by a quarter. When segmenting by an eighth the number of detections drops off more substantially. However, as one increases the number of segments, the size of the covariance matrices decreases and the algorithm becomes more parallelizable and thus computational complexity and speed greatly improve. For practical implementation, this may be a necessary trade-off.

TABLE 1

Number of detected targets for number of segments

|  | 1 seg. | 2 seg. | 4 seg. | 8 seg. |
|---|---|---|---|---|
| # targets detected | 199 | 173 | 167 | 118 |

FRACTA.E version 5 is a modification to FRACTA that includes Knowledge-aided Covariance Estimation (KACE), or partial approximate knowledge of the clutter covariance matrix, which is based on the simplified General Clutter Model (GCM) described in "Airborne/spacebased radar STAP using a structured covariance matrix," K. Gerlach and M. L. Picciolo, *IEEE Trans. AES*, vol. 39, no. 1, pp. 269–281, January 2003, ("Gerlach and Picciolo"), incorporated herein by reference, and in "Space-time adaptive processing for airborne radar," J. Ward, MIT Lincoln Lab Technical Report ESC-TR-94-109, December 1994, also incorporated herein by reference. Prior knowledge is assumed for the number of antenna elements and pulses in the CPI, the radar β parameter (the number of half-wavelengths traversed by the platform between successive pulses which measures the slope of the clutter ridge in azimuth-Doppler), the crab angle, the clutter power, the model for the intrinsic clutter motion (i.e. Gaussian, Billingsley, etc.) and its associated parameters, the element-spacing to wavelength ratio, and the look direction azimuth and depression angles. All of these are either system design parameters or are readily measurable (but not necessarily accurate). In general, the KACE covariance matrix takes the form $$\tilde{R}_{KACE} = \sum_{l=1}^{N_C} \xi_l (\Gamma_l \circ b_l b_l') \otimes (a_l a_l') \quad (7)$$

where $N_c$ is the number of independent clutter patches evenly distributed in azimuth, $\xi_e$, $\Gamma_l$, $b_l$, and $a_l$ are the power, intrinsic clutter covariance matrix, temporal steering vector, and spatial steering vector, respectively, of the $l^{th}$ clutter patch which are functions of the parameters above. The operators ○ and ⊗ are the Hadamard and Kronecker matrix product operators, respectively.

It was shown in Gerlach and Picciolo that despite a mismatch in the GCM covariance matrix due to moderate inaccuracies in the a priori parameters, the use of the KACE covariance matrix can still provide significant performance improvement because what is not known or properly incorporated into the assumed clutter covariance matrix, is contained partially in an estimated component of the model.

KACE is employed in the computation of the AMF weight vectors as $$\hat{w} = (\tilde{R} + \tilde{R}_{KACE})^{-1} s \quad (8)$$

such that the effective covariance matrix is comprised of both clutter covariance information measured directly from the environment and estimated a priori information.

Figure 8:
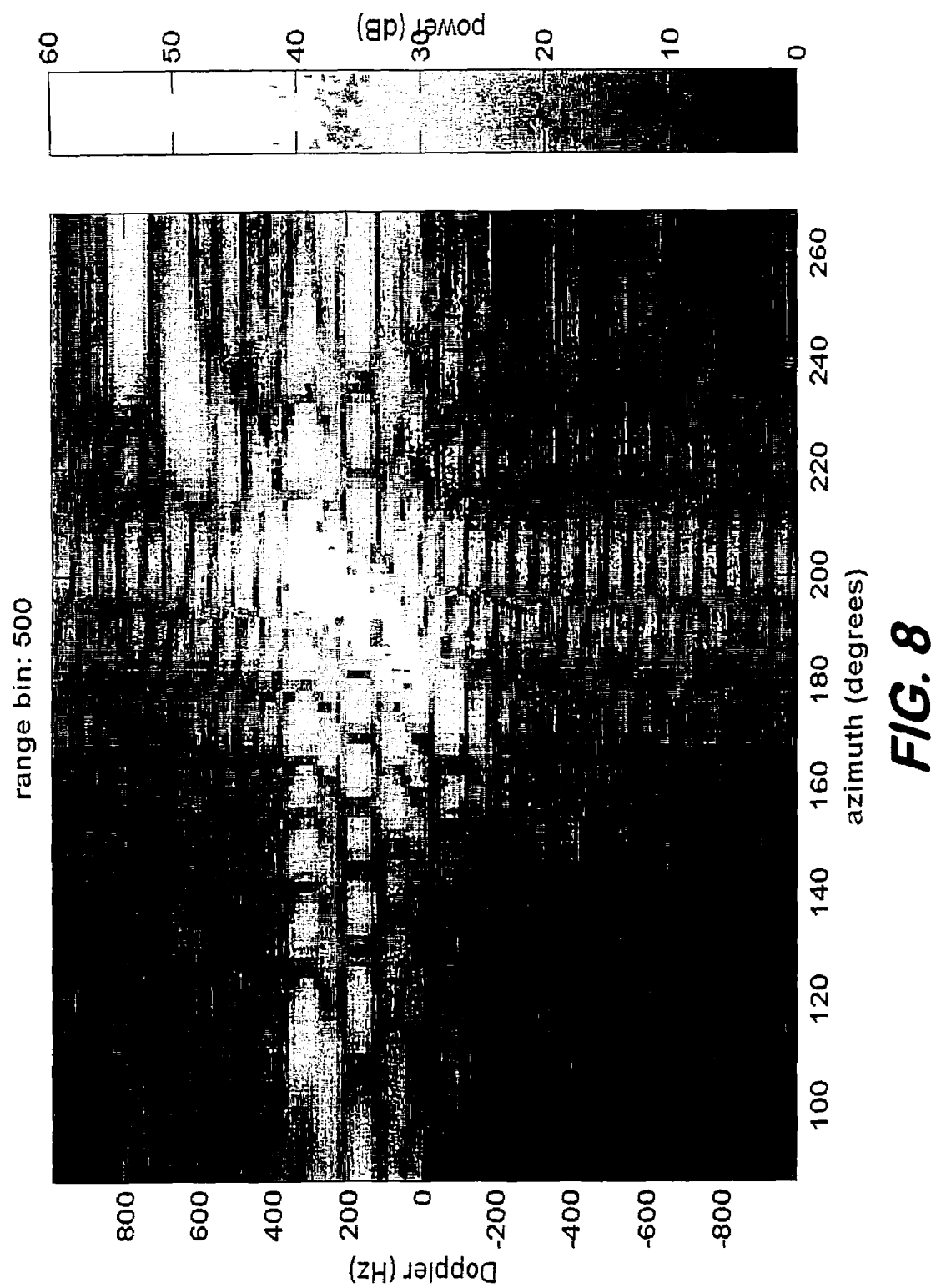
FIG. 8 is a graph for the KASSPER datacube illustrating the clutter power at a specific range as a function of azimuth and Doppler according to the invention.
Figure 9:
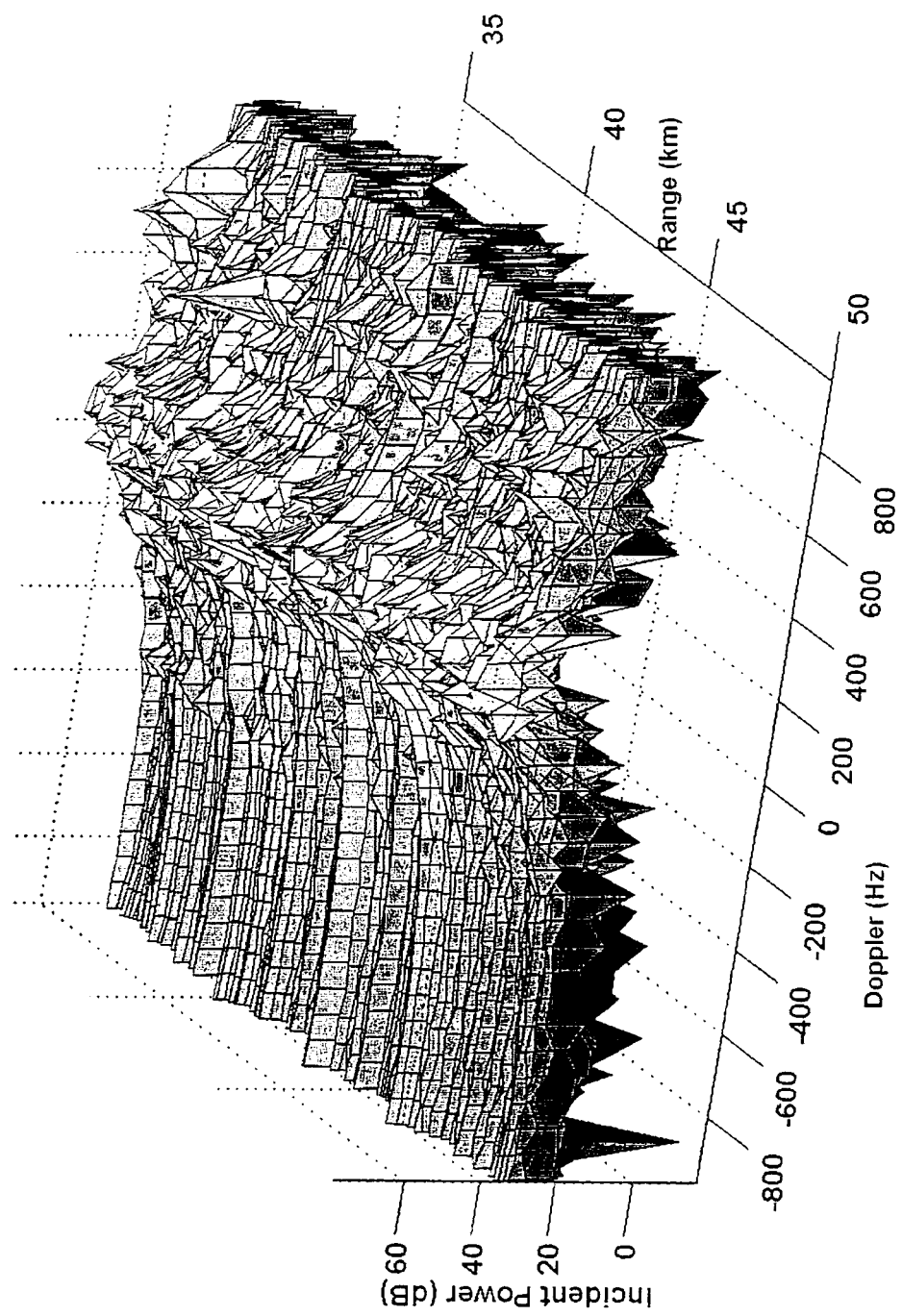
FIG. 9 is a graph for the KASSPER datacube showing the incident power along the boresight direction in terms of range (35–50 km) and Doppler according to the invention.

For range cell 500, FIG. 8 illustrates the clutter power at a specific range as a function of azimuth and Doppler. FIG. 9 shows the incident power along the boresight direction in terms of range (35–50 km) and Doppler. The radar operating parameters for the KASSPER datacube can be found in Table 2.

TABLE 2

Operating parameters for KASSPER

| Parameter | Value |
| --- | --- |
| Carrier frequency | 1240 MHz |
| Bandwidth | 10 MHz |
| Number of pulses (M) | 32 |
| Number of array channels (N) | 11 |
| Pulse repetition frequency | 1984 Hz |
| β | 0.923 |
| Crab angle | 3° |
| Clutter power | 37 dB |
| Antenna element spacing (half-λ) | 0.9028 |
| Depression angle | 5° |

The performance in simulations of FRACTA.E (versions 1, 2, 3, and 5), i.e. when supplementing the data-estimated covariance matrix with KACE, is as follows. For KACE one assumes a Gaussian intrinsic clutter model with correlation coefficient ρ=1 and employing the parameters from Table 2. A CSR is applied to halt censoring that is 10 dB above the noise floor, which has been normalized to unity. Furthermore, since the clutter returns can be several orders of magnitude greater than the noise floor near the clutter ridge, a maximum number of censored cells is instituted for each Doppler bin and is set to 100. Also, all 1000 range cells are used for Global Censoring.

Figure 10:
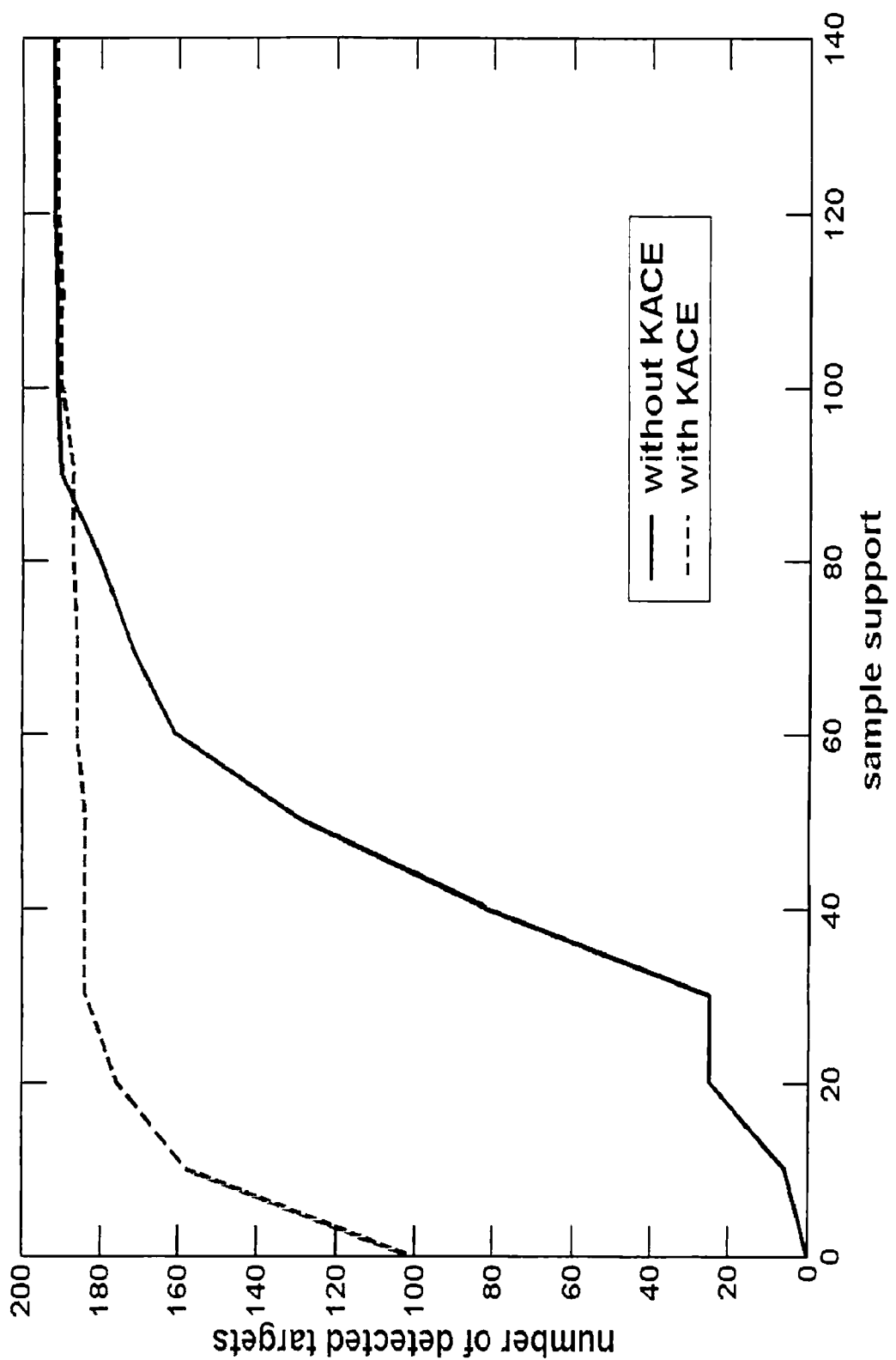
FIG. 10 is a graph showing the detection performance using FRACTA.E versions 1,2,3, and 5 (with the CSR, GC, FRC, and KACE enhancements) according to the invention.
Figure 11:
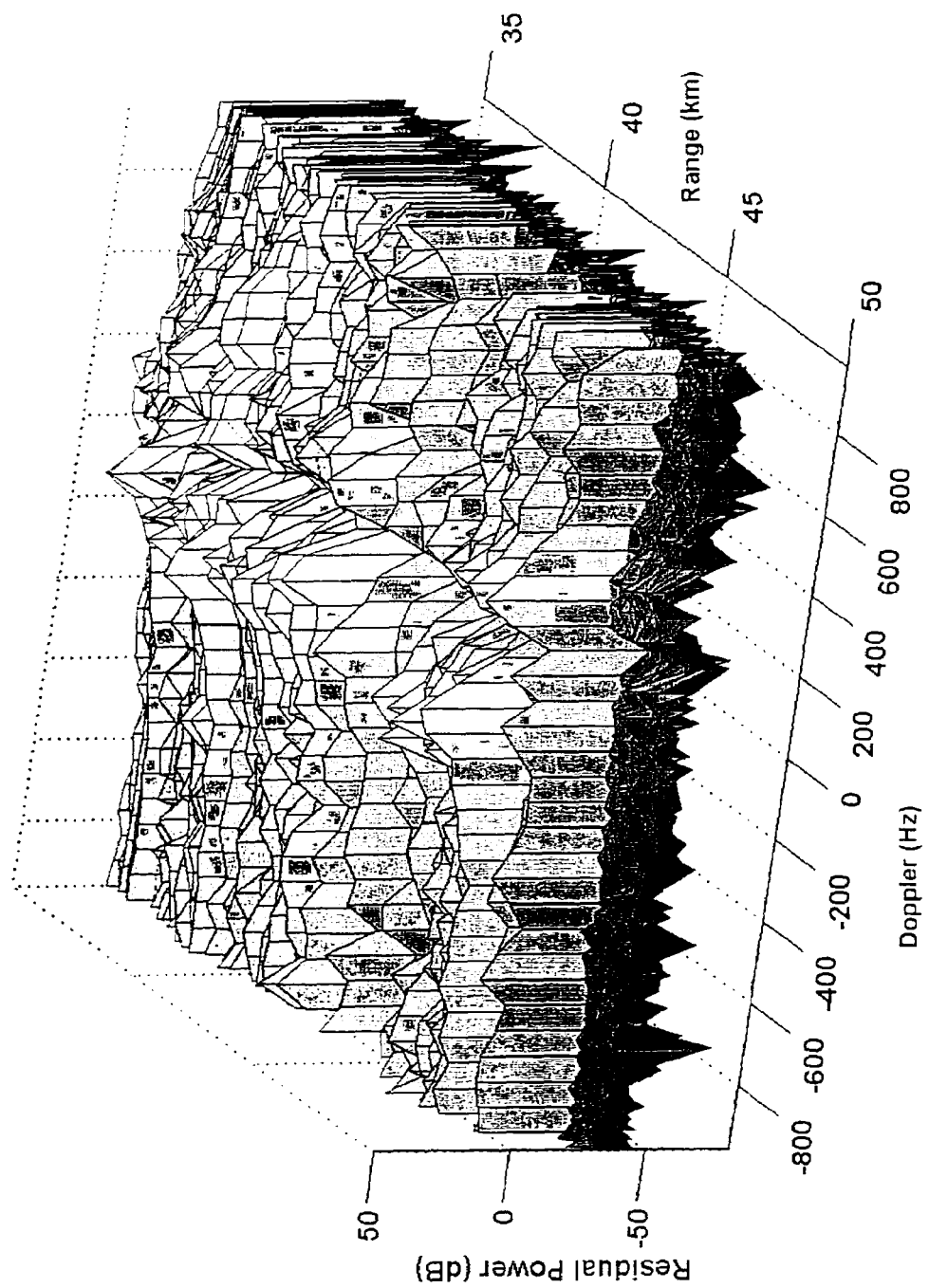
FIG. 11 is a graph showing the APR for a sample support of 30 using FRACTA.E versions 1,2, and 3 (with the CSR, GC, and FRC enhancements) according to the invention.
Figure 12:
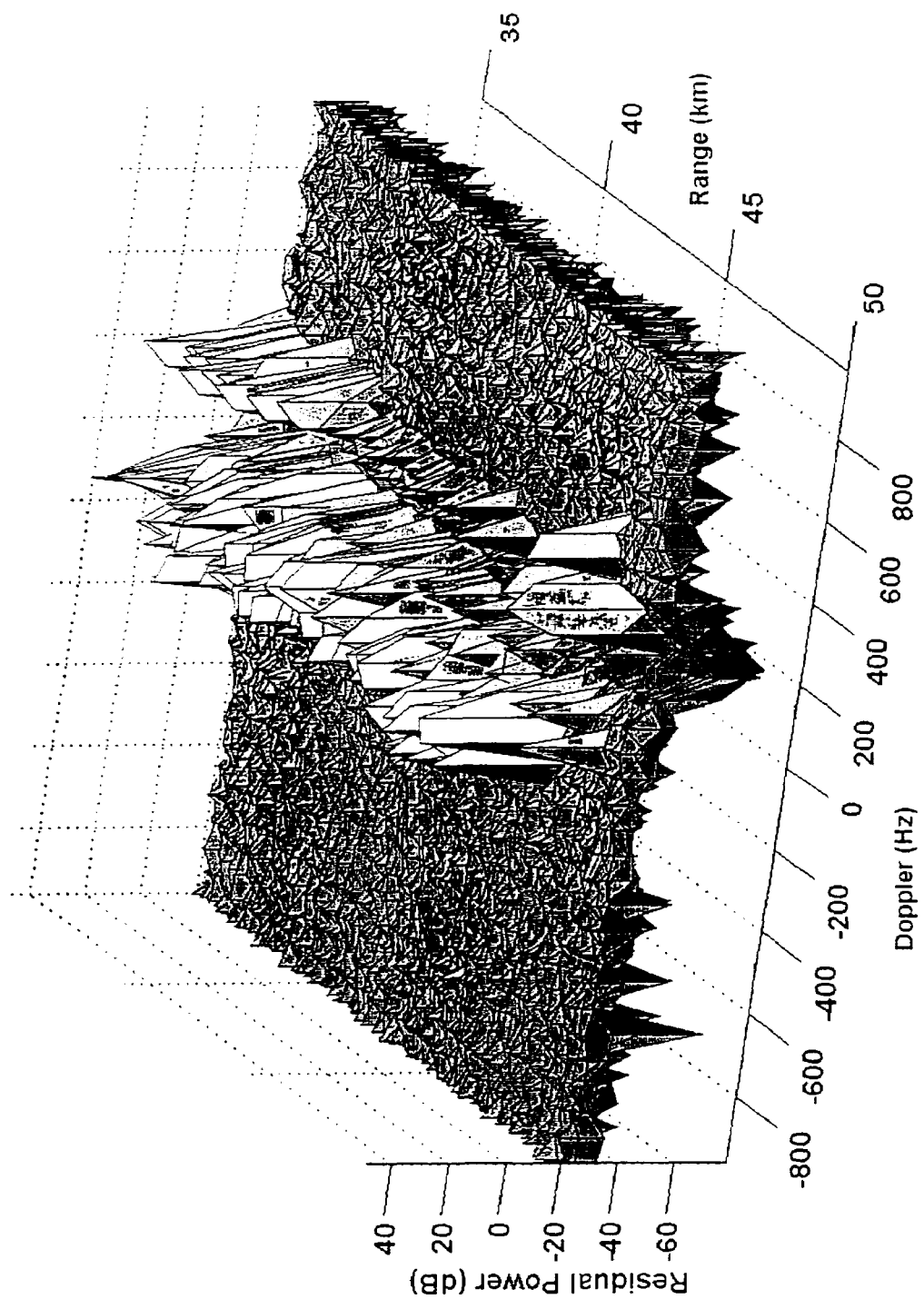
FIG. 12 is a graph showing the APR for a sample support of 30 using FRACTA.E as in FIG. 11 except also using FRACTA.E version 5 (the KACE enhancement) according to the invention.

FIG. 10 presents the number of target detections for a single false alarm (this corresponds to $P_F \cong 3 \times 10^{-5}$) when using different sample support for the AMF weight computation. There are roughly J=50 dominant eigenvalues for the KASSPER datacube. Hence, above 2×50=100 samples FRACTA.E (versions 1,2, and 3 combined) detects 192 out of the 268 targets present. This is the same number of targets detected as when clairvoyant knowledge of the clutter covariance is used, as described in "Efficient reiterative censoring of robust STAP using the FRACTA algorithm," S. D. Blunt and K. Gerlach, *Proc. Intl. Conf. on Radar*, pp. 57–61, Adelaide, Australia, Sep. 3–5, 2003, incorporated herein by reference. As one would expect, the detection performance degrades as the sample support decreases due to insufficient information from which to estimate the covariance matrix. However, when the data-estimated covariance matrix is supplemented with KACE as described in "Robust adaptive signal processing methods for heterogeneous radar clutter scenarios," M. Rangaswamy, F. C. Lin, and K. R. Gerlach, *IEEE Radar Conf.*, pp. 265–272, Huntsville, Ala., May 5–8, 2003, incorporated herein by reference, the detection performance of FRACTA.E (versions 1, 2, 3, and 5) is maintained at a high level for much lower sample support. In fact, quite close to clairvoyant performance is maintained for sample support as low as J/2. It is also evident that at 0 sample support, which is the situation in which KACE alone is used without adaptation to the data, 101 out of 268 of the targets are detected. The performance improvement gained by employing KACE (version 5) with FRACTA.E (versions 1, 2, and 3 combined) can especially be seen when one examines the output power residue (i.e. the APR) for a low sample support. FIGS. 11 and 12 illustrate the APR for a sample support of 30 for FRACTA.E (versions 1, 2, and 3) and FRACTA.E (versions 1, 2, 3, and 5), respectively. FRACTA.E with KACE (versions 1, 2, 3, and 5) sufficiently mitigates the clutter thereby revealing the targets, all of which are quite close to the clutter ridge.

Obviously many modifications and variations of the present invention are possible in the light of the above teachings. It is therefore to be understood that the scope of the invention should be determined by referring to the following appended claims.

We claim:

1. An adaptive radar processing system, comprising:
   an antenna array for transmitting a radar signal and for receiving a return radar signal; and
   a signal processor programmed with a FRACTA algorithm stored in the signal processor on a computer readable medium, said algorithm including a stopping criterion for censoring samples, said stopping criterion being adaptive to a radar return data set.

2. A radar processing system as in claim 1, wherein the FRACTA algorithm includes an Adaptive Power Residue subprogram for censoring data vectors from a set of Initial Training Data.

3. A radar processing system as in claim 1, wherein the stopping criterion comprises a probe data vector appended to a data block of the form $\alpha_p s$, where $\alpha_p$ is a pre-determined magnitude set such that the probe vector is nominally detectable above a noise floor, an APR of the probe is $|\alpha_p s' \tilde{R}^{-1} s|^2$, and when said APR of the probe exceeds an APR for substantially all true data vectors, censoring is halted.

4. An adaptive radar processing system, comprising:
   an antenna array for transmitting a radar signal and for receiving a return radar signal; and
   a signal processor programmed with a FRACTA algorithm stored in the signal processor on a computer readable medium, wherein adaptation is performed at less than full resolution.

5. A radar processing system as in claim 4, wherein respective data vectors are segmented and adaptation is performed on each segment.

6. A radar processing system as in claim 5, wherein p segmented correlation matrices are recombined as $$\tilde{R}^{-1} = \begin{bmatrix} \tilde{R}_1^{-1} & 0 & \cdots & 0 \\ 0 & \tilde{R}_2^{-1} & \ddots & \vdots \\ \vdots & \ddots & \ddots & 0 \\ 0 & \cdots & 0 & \tilde{R}_P^{-1} \end{bmatrix}$$

to generate a recombined correlation matrix used to compute the APR and an ACE.

7. An adaptive radar processing system, comprising:
   an antenna array for transmitting a radar signal and for receiving a return radar signal; and a signal processor programmed with a FRACTA algorithm stored in the signal processor on a computer readable medium, said algorithm including Knowledge-aided Covariance Estimation (KACE).

8. A radar processing system as in claim 7, wherein a KACE covariance matrix takes the form $$\tilde{R}_{KACE} = \sum_{l=1}^{N_c} \xi_l(\Gamma_l \circ b_l b_l') \otimes (a_l a_l')$$

where $N_c$ is the number of independent clutter patches evenly distributed in azimuth, $\xi_l$, $\Gamma_l$, $b_l$, and $a_l$ are the power, intrinsic clutter covariance matrix, temporal steering vector, and spatial steering vector, respectively, of the $l^{th}$ clutter patch which are functions of the parameters above, the operators $\circ$ and $\otimes$ are the Hadamard and Kronecker matrix product operators, respectively; and KACE is employed in the computation of the AMF weight vectors as $$\hat{w} = (\tilde{R} + \tilde{R}_{KACE})^{-1} s$$

such that the effective covariance matrix is comprised of both clutter covariance information measured directly from the environment and estimated a priori information.

9. An adaptive radar processing system, comprising:
an antenna array for transmitting a radar signal and for receiving a return radar signal; and a signal processor programmed with a FRACTA algorithm stored in the signal processor on a computer readable medium, said algorithm including global censoring.

10. An adaptive radar processing system, comprising:
an antenna array for transmitting a radar signal and for receiving a return radar signal; and a signal processor programmed with a FRACTA algorithm stored in the signal processor on a computer readable medium, said algorithm including fast reiterative censoring.

11. A method for adaptive radar processing, comprising:
transmitting a radar signal;
receiving a return radar signal; and
processing the return radar signal with a FRACTA algorithm stored on a computer readable medium, said algorithm including a stopping criterion for censoring samples, said stopping criterion being adaptive to a radar return data set.

12. An adaptive radar processing method as in claim 11, wherein the FRACTA algorithm includes an Adaptive Power Residue subprogram for censoring data vectors from a set of Initial Training Data.

13. An adaptive radar processing method as in claim 11, wherein the stopping criterion comprises a probe data vector appended to a data block of the form $\alpha_p s$, where $\alpha_p$ is a pre-determined magnitude set such that a probe vector is nominally detectable above a noise floor, an APR of the probe is $|\alpha_p s' \tilde{R}^{-1} s|^2$, and when said APR of the probe exceeds an APR for substantially all true data vectors, censoring is halted.

14. A method for adaptive radar processing, comprising:
transmitting a radar signal;
receiving a return radar signal; and
processing the return radar signal with a FRACTA algorithm stored on a computer readable medium.

15. An adaptive radar processing method as in claim 14, wherein respective data vectors are segmented and adaptation is performed on each segment.

16. An adaptive radar processing method as in claim 15, wherein p segmented correlation matrices are recombined as $$\tilde{R}^{-1} = \begin{bmatrix} \tilde{R}_1^{-1} & 0 & \cdots & 0 \\ 0 & \tilde{R}_2^{-1} & \ddots & \vdots \\ \vdots & \ddots & \ddots & 0 \\ 0 & \cdots & 0 & \tilde{R}_P^{-1} \end{bmatrix}$$

to generate a recombined correlation matrix used to compute the APR and an ACE.

17. A method For adaptive radar processing, comprising:
transmitting a radar signal;
receiving a return radar signal; and
processing the return radar signal with a FRACTA algorithm stored on a computer readable medium, said algorithm including Knowledge-aided Covariance Estimation (KACE).

18. An adaptive radar processing method as in claim 17, wherein a KACE covariance matrix takes the form $$\tilde{R}_{KACE} = \sum_{l=1}^{N_c} \xi_l(\Gamma_l \circ b_l b_l') \otimes (a_l a_l')$$

where $N_c$ is the number of independent clutter patches evenly distributed in azimuth, $\xi_l$, $\Gamma_l$, $b_l$, and $a_l$ are the power, intrinsic clutter covariance matrix, temporal steering vector, and spatial steering vector, respectively, of the $l^{th}$ clutter patch which are functions of the parameters above, the operators $\circ$ and $\otimes$ are the Hadamard and Kronecker matrix product operators, respectively; and KACE is employed in the computation of the AMF weight vectors as $$\hat{w} = (\tilde{R} + \tilde{R}_{KACE})^{-1} s$$

such that the effective covariance matrix is comprised of both clutter covariance information measured directly from the environment and estimated a priori information.

19. A method for adaptive radar processing comprising:
transmitting a radar signal;
receiving a return radar signal; and
processing the return radar signal with a FRACTA algorithm stored on a computer readable medium, said algorithm including global censoring.

20. A method for adaptive radar processing, comprising:
transmitting a radar signal;
receiving a return radar signal; and
processing the return radar signal with a FRACTA algorithm stored on a computer readable medium, said algorithm including fast reiterative censoring.

* * * * *